Sept. 4, 1934.  F. O. KILGORE  1,972,403
CUSHIONING DEVICE
Filed Jan. 12, 1932
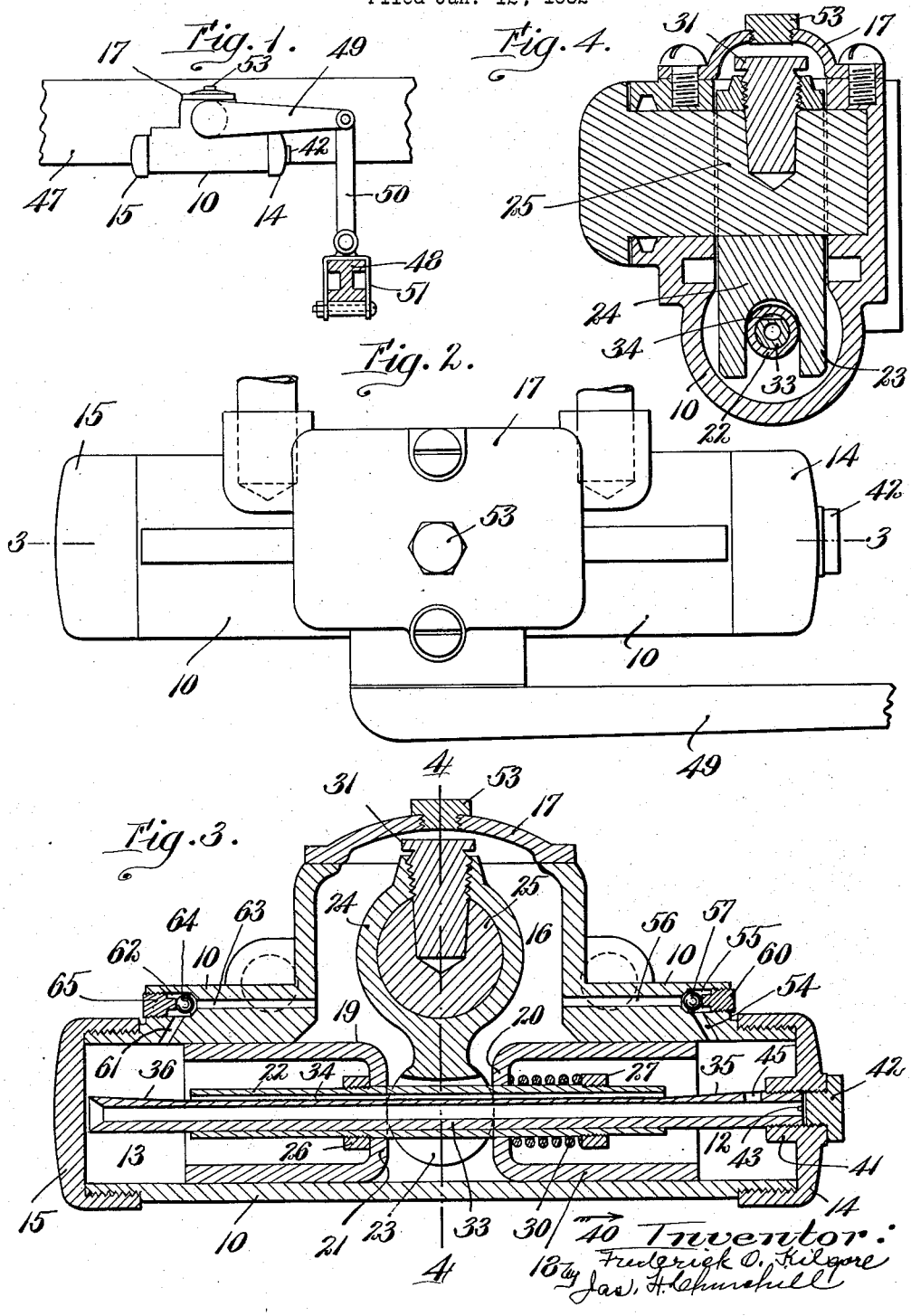

Patented Sept. 4, 1934

1,972,403

UNITED STATES PATENT OFFICE 1,972,403

CUSHIONING DEVICE

Frederick O. Kilgore, Brookline, Mass.

Application January 12, 1932, Serial No. 586,112

5 Claims. (Cl. 188—88)

This invention relates to a cushioning device or apparatus especially adapted for use on automobiles and like vehicles to absorb the shocks due to uneven roads.

The invention has for its object to provide a superior, durable and inexpensive device for the purpose specified, in which any desired fluid may be used but which is particularly adapted for using light oil or other liquid.

The invention further has for its object to provide a cushioning device in which a body of liquid or other fluid is moved alternately in opposite directions and has a free and unrestrained movement for the intermediate portion of its travel and a gradually restrained or retarded movement at the ends of its travel as will be described, whereby under smooth or normal road conditions the body of the vehicle moves freely in response to slight irregularities in the surface of the road, and under abnormal or rough road conditions is restrained or checked in its up and down movement at the ends of such movements, thereby obtaining a superior riding vehicle equipped with the improved cushioning devices. Provision is made for adjusting the cushioning device to the action of the springs with which the vehicle is equipped.

These and other features of this invention will be pointed out in the claims at the end of this specification.

Fig. 1 represents a portion of a motor vehicle provided with a shock absorber or cushioning device embodying the invention;

Fig. 2, a plan view of the cushioning device on a larger scale;

Fig. 3, a longitudinal section on the line 3—3, of the cushioning device shown in Fig. 2, and Fig. 4, a cross section on the line 4—4, Fig. 3.

In the construction herein shown 10 represents a stationary casing having in it opposing cylinders 12, 13 provided at their outer ends with removable heads 14, 15, and having their inner ends adapted to communicate with a relatively large chamber 16 formed by an intermediate enlargement of the casing 10.

The chamber 16 is provided at its upper end with a removable cover 17 suitably attached to the enlargement of the casing 10.

The cylinders 12, 13 contain pistons 18, 19 preferably made as herein shown and consisting of cylinders open at one end and provided with heads or closure members 20, 21 at their other ends.

The pistons 18, 19 are designed to be moved simultaneously, and to this end they are mounted upon a hollow piston rod 22 which is extended through a suitable ball-shaped end 23 of a crank 24 mounted upon a rock-shaft 25 extended into and outside of the chamber 16. The ball-shaped end 23 of the crank 24 is located between the heads 20, 21 of the cylinders and is designed to effect reciprocation of the pistons 18, 19 within their cylinders 12, 13. The hollow piston rod 22 has mounted upon it a nut 26 which is located within the hollow piston 19 and co-operates with the head 21 thereof to act as a fixed abutment against which the ball-shaped end 23 of the crank forces the head 21 of the piston 19. The hollow piston rod 22 is provided within the hollow piston 18 with a nut 27 which is in threaded engagement with a portion of the rod 22 and acts as an abutment for a spring 30 which encircles the hollow piston rod between the nut 27 and the head 20 of the hollow piston 18. The spring 30 acts to force the head 20 against the ball-shaped end 23 of the crank 24, and thereby maintains the heads 20, 21 of the hollow pistons 18, 19 in engagement with the crank and automatically takes up any wear between the crank and the heads of the said pistons. The crank 24 may be secured to the rock-shaft 25 by a pin 31 in a manner well understood.

The enlarged chamber 16 is designed to receive the fluid which is employed as a cushioning medium.

The fluid may be air, light oil or other liquid, and the construction herein shown is designed to employ a liquid, such for instance, as a light oil or glycerin, and provision is made for the passage of the liquid from one cylinder to the other.

Provision is also made for permitting a relatively free passage of the oil or other liquid through the hollow piston rod 22 when the pistons are moved by the crank 24 a limited distance, as, for instance, when the automobile is passing over relatively smooth roads, and to provide for restricting the flow of oil when the vehicle is passing over relatively rough roads. To this end the hollow piston rod 22 has co-operating with it a hollow rod 33, which is provided with a cylindrical portion of substantially the same length as the hollow piston rod 22, which cylindrical portion co-operates with the hollow piston rod to form a passage 34 through which oil can freely pass from one cylinder to the other in response to slight irregularities in the road surface.

The hollow rod 33 at its opposite ends is provided with tapering or inclined end surfaces 35, 36, which taper upwardly beyond the ends of the hollow piston rod 22.

The inclined surface 35 co-operates with the end of the hollow piston rod 22 on which the piston 18 is mounted so as to narrow the mouth of the passage 34 when the piston 18 is moved in the direction indicated by the arrow 40 in Fig. 3, and the inclined surface 36 co-operating with the opposite end of the hollow piston rod 22 to narrow the mouth of the passage 22 at the end of the rod when the piston 19 is moved in the direction opposite to that indicated by the arrow 40.

In this way the amount of fluid which can pass through the hollow piston rod 22 is diminished or increased according to the distance the pistons 18, 19 are moved by the rough conditions of the road.

As the amount of fluid which flows through the hollow piston rod 22 is diminished, the resistance to the movement of the piston is increased, consequently the resistance to the movement of the rock-shaft 25 is increased and in this manner the movement of the vehicle body with which the rock-shaft is connected is diminished.

In the present instance the hollow rod 33 is shown as a continuous rod which is extended beyond the opposite ends of the hollow piston rod 22, and one end of the hollow rod 33 is fastened to the head of one of the cylinders.

In the present instance one end of the rod 33 is in threaded engagement with a threaded boss 41 on the inner side of the head 14, and said rod 35 is protected by a plug or cap 42 carried by the head 14.

Access to the head 33 may be had by removing the cap or plug member 42, and the rod may be provided with a cross slot 43 for the reception of a screw-driver or other tool by which the hollow rod 33 may be turned in the boss 41 to position the opposite end of the rod with relation to the head 15 of the cylinder 13.

The hollow rod 33 also acts as a by-pass rod to enable the fluid from the cylinder 13 to pass to the cylinder 12 through a port or opening 45 in the rod. The free end of the hollow rod 33 is adjusted with relation to the head 15 of the cylinder 13 to regulate the amount of oil which can pass through the hollow rod 33 into the cylinder 12, and this construction also provides for an automatic diminishing of the distance between the end of the hollow rod 13 and the head 15 according to variations in temperature.

In warm weather the hollow rod 13 will expand and diminish the opening between the end of the hollow rod 33 and the head 15 and thereby cut down the amount of oil which can pass through the hollow rod to the cylinder 12, whereas in cold weather the hollow rod 33 will contract and increase the distance between the end of the rod and the head 15 and thereby provide a larger opening or outlet from the cylinder 13 into the hollow rod and thence into the cylinder 12.

The casing 10 is secured to the chassis or body 47 of the vehicle and the rock-shaft 25 is connected with an axle 48 of the vehicle, and in the present instance this connection is shown as a crank 49 on the rod-shaft 25, a link 50, and a stirrup 51.

Oil or other liquid may be supplied to the casing through an opening in the cover 17, which opening is normally closed by a plug or cap 53.

Provision is made for the passage of air which may accumulate in the cylinders 12, 13 out therefrom into the chamber 16, and thereby ensure the cylinders being filled with oil at all times in case of leakage between the heads 14, 15 and the cylinders, and avoiding the emulsification of the oil in the cylinders. To this end, the cylinder 12 is connected by a passage 54 with a valve chamber 55 formed in the casing 10 and connected with the chamber 16 by a passage 56. The valve chamber 55 contains a ball valve 57, which is forced to its seat to close the passage 56 and thereby cut off the chamber 16 from the cylinder 12, when the piston 18 is moved slightly into the cylinder 12, and to open the passage 56 and allow the air in the cylinder 12 above the body of liquid therein to pass into the chamber 16 in the form of bubbles through the passage 54, valve chamber 55 and passage 56, when the piston is moved slightly in the opposite direction. The air in the cylinders 12, 13 remains above the incoming oil from the supply chamber 16 and escapes in the form of minute bubbles past the ball valves and through the passages 56, 63 into the chamber 16. This action takes place when the movement of the pistons is a slight one as when the vehicle is traveling on relatively smooth roads.

The movement of the ball valve 57 away from its seat is limited by the set screw or back stop 60.

The cylinder 13 is connected with the chamber 16 in a similar manner through the passage 61, valve chamber 62, and passage 63, the passing of air being controlled by a ball valve 64, with which co-operates the back stop 65.

What is claimed is:

1. In a cushioning device of the character described, in combination, a casing provided with opposing cylinders, pistons in said cylinders, a hollow piston rod connecting said cylinders for the passage of fluid from each cylinder to the other and upon which said pistons are mounted, an actuating device interposed between said pistons and straddling the hollow piston rod to reciprocate the pistons simultaneously and force the fluid through said hollow piston rod from each cylinder to the other, and means co-operating with said hollow piston rod and with one of said pistons for maintaining both pistons in operative relation to said actuating device.

2. In a cushioning device of the character described, in combination, a casing provided with opposing cylinders, pistons in said cylinders, a hollow piston rod open at its opposite ends for connecting said cylinders for the passage of fluid from each cylinder to the other and upon which said pistons are mounted, an actuating device interposed between said pistons to reciprocate the same, and a spring mounted upon said hollow piston rod and co-operating with one of said pistons to automatically maintain both pistons in engagement with said actuating device.

3. In a cushioning device of the character described, in combination, a casing provided with opposing cylinders, pistons in said cylinders, a hollow piston rod open at its opposite ends for connecting said cylinders for the passage of fluid from each cylinder to the other through said hollow piston rod and upon which said pistons are mounted, a hollow rod extended through said hollow piston rod and having inclined end portions co-operating with the open ends of said hollow piston rod, means for adjustably securing one end of the hollow rod to a head of one of said cylinders to enable the other end of the hollow rod to be manually adjusted toward and from the head of the other of said cylinders, said hollow rod having a port at its fixed end communicating with the cylinder to which the said hollow rod is secured, and means for reciprocating said hollow piston rod and said pistons.

4. In a cushioning device of the character described, in combination, a casing provided with opposing cylinders, pistons in said cylinders, a hollow piston rod open at its opposite ends for connecting said cylinders for the passage of fluid from each cylinder to the other through said hollow piston rod and upon which said pistons are mounted, a hollow rod extended through said hollow piston rod and having inclined end portions co-operating with the open ends of said hollow piston rod, means for permitting adjustment of the said hollow rod toward and from the head of one of said cylinders, and means for reciprocating said hollow piston rod and said pistons.

5. In a cushioning device of the character described, in combination, a casing provided with opposing cylinders, pistons in said cylinders, a hollow piston rod open at its opposite ends for connecting said cylinders for the passage of fluid from each cylinder to the other through said hollow piston rod and upon which said pistons are mounted, a hollow rod extended through the hollow piston rod and communicating at its opposite ends with said cylinders to form a by-pass within the hollow piston rod, and means for reciprocating said hollow piston rod and said pistons.

FREDERICK O. KILGORE.